Patented May 27, 1952

2,598,436

UNITED STATES PATENT OFFICE 2,598,436

METHOD FOR PREPARING ORGANOHALO-
GENOSILANES

Donald Mohler, Schenectady, and Jesse E. Sellers,
Scotia, N. Y., assignors to General Electric
Company, a corporation of New York No Drawing. Application September 21, 1949,
Serial No. 117,074

4 Claims. (Cl. 260—448.2)

This invention relates to the preparation of organohalogenosilanes. More particularly, it is concerned with a process for preparing organohalogenosilanes which comprises effecting reaction between (1) an aromatic (e. g., aryl) halide and (2) a halogenosilane containing a silicon-bonded hydrogen atom and a silicon-bonded halogen atom, thereby to form an aromatic halogenosilane containing less halogen in the aromatic nucleus than was originally present in the aromatic nucleus of the aromatic halide.

It has been disclosed in U. S. patent 2,379,821, issued July 3, 1945, that organohalogenosilanes may be prepared by effecting reaction between a hydrocarbon and an inorganic silicon halide in the vapor phase at a temperature of at least 450° C. The patentees disclose that the hydrocarbons may contain a substituent thereon, specifically a halogen. Referring to such a halogen-substituted hydrocarbon, the patentees further point out that the halogen substituent is inert in the reaction.

We have now discovered that, contrary to the disclosures and teachings in the aforementioned U. S. Patent 2,379,821, the presence of the halogen substituent on the aromatic hydrocarbon nucleus increases the reactivity of the aromatic hydrocarbon to such a degree that greatly improved yields of arylhalogenosilanes can be realized in the reaction between the halogen-substituted aromatic hydrocarbon and the aforementioned halogenosilane containing a silicon-bonded hydrogen atom and a silicon-bonded halogen atom. Moreover, we have found that, in addition to increasing the reactivity of the aryl hydrocarbon with the attendant result of being able to use much lower temperatures than is possible with hydrocarbon free of halogen substituents, the halogen substituent on the aryl hydrocarbon is so reactive as to be removed from the hydrocarbon residue, leaving behind an unsatisfied carbon valence which attaches to an unsatisfied silicon valence of the halogenosilane left vacant by the removal of a silicon-bonded hydrogen atom from the halogenosilane. As a result of our claimed reaction, which is identified by the following exemplary equation:

$$C_6H_5Cl + SiHCl_3 \rightarrow C_6H_5SiCl_3 + HCl$$

one of the by-products formed is a hydrogen halide whereas, according to the teachings and disclosures of the aforementioned U. S. Patent 2,379,821, one of the by-products formed is a molecule of hydrogen derived from an atom of hydrogen from the organic hydrocarbon and an atom of hydrogen from the halogenosilane, the halogen on the organic hydrocarbon remaining essentially inert and nonreactive in the reaction, according to the patentees.

In accordance with our invention, an aryl halide is reacted with a halogenosilane (for brevity hereinafter so designated) containing a silicon-bonded hydrogen atom and a silicon-bonded halogen atom, at elevated temperatures of the order of from about 300° C. to below the decomposition point of the reactants and the reaction products. Thus, we may employ temperatures of the order of from about 300° C. to 800° C. or more, preferably from 450° to 600° C. It will, of course, be understood that under many conditions of reaction, higher or lower temperatures may be employed without departing from the scope of the invention and that we do not intend to be limited to the specific temperature ranges disclosed above. However, temperatures much above 600° C. usually result in undesirable excesses of complex materials due to decomposition, side reactions, etc.

The aromatic halide employed in the practice of our invention may be generally stated to conform to the general formula RX where X is a halogen (e. g., chlorine, bromine, fluorine, etc.) and R is a monovalent aryl radical, such as, for instance, phenyl, naphthyl, anthracyl, tolyl, xylyl, ethylphenyl, etc. R may also be a heterocyclic organic radical as, for instance, the furyl radical, the triazinyl radical, thienyl radical, etc.

It has been found that an aromatic hydrocarbon halide can be controlled better in our claimed invention than alkyl halides such as, for instance, methyl chloride which when reacted with $SiHCl_3$ at 500° C. was found to explode. It will, of course, be understood that the aryl halide may also contain other substituents thereon as, for example, additional halogens, etc. Thus, we may employ additionally halogenated aromatic hydrocarbons as, for instance, dichlorobenzene, tribromobenzene, tetrachlorobenzene, hexachlorobenzene, etc.

As pointed out previously, the aromatic halide is caused to react with a halogenosilane containing a silicon-bonded hydrogen atom and a silicon-bonded halogen atom. Examples of such halogenosilanes are, for instance, $SiHCl_3$, $SiH_2Cl_2$, $SiH_3Cl$, $SiHBr_3$, $CH_3SiHCl_2$, $(CH_3)_2SiHCl$, $C_6H_5SiHBr_2$, $(C_6H_5CH_2)_2SiHCl$, $CH_3C_6H_4SiHCl_2$, $(C_2H_5)SiH_2Cl$, $C_6H_{13}SiHCl_2$, etc. Generally, the halogenosilanes employed in the practice of this invention will conform to the formula $$SiH_mX_nR_{4-n-m}$$

where X is a halogen (for instance, chlorine, bromine, etc.), R is, for instance, a monovalent hydrocarbon radical (for instance, alkyl, aryl, aralkyl, alkaryl, alkylene, cycloaliphatic, etc. radicals), many examples of which have been given previously, and $m$ and $n$ are each integers equal to from 1 to 3, inclusive, the total of $m$ and $n$ being equal to at most 4.

In practicing our invention, the aromatic halide and halogenosilane are preferably passed together through a heated reaction zone maintained at a suitable temperature. Thus, we have found it advantageous to pass the mixture of reactants through a heated tube maintained at the desired temperature depending upon the reactants used, the time of contact, etc. Such vapor phase operations are preferable since they lend themselves readily to continuous processing while at the same time permitting the use of higher temperatures because the time of contact at these elevated temperatures is much less than in the case of batch operations. We have found it desirable, where the reactants are being passed through a heated reaction zone, to employ inert materials in the zone to aid in the uniform heating of the vapors or gases. Among such compositions may be mentioned carborundum, heat-resistant glass beads, silica, porcelain, carbon, etc., as well as other materials resistant to and nonreactive with the reactants or the reaction product.

It will, of course, be apparent to those skilled in the art that other methods may be employed for effecting the reaction without departing from the scope of our claimed invention. Thus, one may heat the reactants in a closed reaction vessel under pressure for a period of time sufficient to cause the reaction to go to completion.

The ratio of the aromatic halide to the halogenosilane may be varied within wide limits. Generally, these reactants are preferably present in from about 0.5 to 3 or more mols of the aromatic halide per mol of the halogenosilane. However, as will be apparent to those skilled in the art, excess molar amounts of either the halogenosilane or the organic halide may also be employed. We have found it advisable for economical purposes and for the purpose of effecting a more complete reaction between the reactants to use a molar excess of the aromatic halide, for instance, from 1 to 2 mols of the aromatic halide per mol of the halogenosilane.

Generally throughout the reaction between the aromatic halide and the halogenosilane, caution should be taken to maintain substantially anhydrous conditions in order to minimize undesirable hydrolysis of either the halogenosilane or the formed organohalogenosilanes. In addition, we have found it advantageous to employ vapor phase operations when using aromatic halides, for example, chlorobenzene, as one of the reactants with the halogenosilane. Such vapor phase procedures permit easier escape of hydrogen halide which, if maintained for too long a time in contact with any formed aromatic halogenosilanes, for instance, phenyltrichlorosilane, tends to reduce the yields of the latter due to fission of the carbon-silicon bond by the hydrogen halide. In this respect, the vapor phase reaction is almost a necessity in order to obtain satisfactory yields.

In order that those skilled in the art may better understand how the present invention may be practiced, the following examples are given by way of illustration and not by way of limitation. All parts are by weight.

EXAMPLE 1

An iron tube was packed with silica gel beads, and a mixture of monochlorobenzene and trichlorosilane was passed through the heated tube at various temperatures, pressures and rates. Another reaction tube was packed with pieces of porcelain scrap, while in another case (sample No. 7) no packing was employed in the reaction tube. In one sample test (sample No. 10) benzene was substituted in place of the chlorobenzene used in the other runs. In each case the formed HCl (when chlorobenzene was used) was allowed to escape as soon as it resulted, and there was employed about a 585 part charge of the mixture of chlorobenzene (or benzene) and trichlorosilane in the ratio of about two mols of the former to one mol of the latter. The following table shows the results of these test runs:

*Table No. I*

| Sample No. | Temperature °C. | Pressure p. s. i. | Rate Parts Per Hour | Parts Phenyl-chloro-Silanes Per Part Unrecovered Trichlorosilane | Packing In Reactor Tube |
|---|---|---|---|---|---|
| 1 | 520 | 0 | 115 | 0.351 | Beads. |
| 2 | 470 | 45 | 115 | 0.315 | Do. |
| 3 | 520 | 40 | 300 | 0.425 | Do. |
| 4 | 575 | 70 | 167 | 0.269 | Do. |
| 5 | 520 | 50 | 107 | 0.369 | Do. |
| 6 | 570 | 85 | 103 | 0.446 | Do. |
| 7 | 520 | 0 | 117 | 0.578 | None. |
| 8 | 520 | 0 | 122 | 0.240 | Porcelain. |
| 9 | 520 | 0 | 130 | 0.337 | Do. |
| 10 | 535 | 0 | 115 | 0.000 | Beads. |

EXAMPLE 2

A mixture of orthodichlorobenzene and trichlorosilane (SiHCl₃) was passed through to a heated tube maintained at a temperature of about 525° C. while permitting the HCl to escape as fast as it formed. The reaction product comprised a mixture of chlorophenylchlorosilanes, including chlorophenyltrichlorosilane.

EXAMPLE 3

Trichlorobenzene and trichlorosilane were passed through a heated tube maintained at a temperature of about 525° C. using conditions similar to those as in Example 1. The reaction product contained a large amount of high boiling chlorosilanes, including a mixture of dichlorophenylchlorosilanes.

EXAMPLE 4

Chlorotoluene and trichlorosilane were passed together through a heated tube maintained at a temperature of about 525° C. The low boiling materials, including chlorotoluene and trichlorosilane, were removed from the reaction product and the remaining mixture which had a boiling point range for tolyltrichlorosilane was hydrolyzed by pouring in water to yield a resinous product.

EXAMPLE 5

A mixture of 1,2,4-trichlorobenzene and methyldichlorosilane (CH₃SiHCl₂) in the molar ratio of 1.25 mols of the former per mol of the latter was passed through a hot tube at atmospheric pressure maintained at a temperature of about 500° C. The mixture of reactants was put through the heated iron tube at a rate of about 500 parts per hour. Fractional distillation of the reaction product yielded about 130 parts of a fraction boiling between 150° and 160° C. at 29 mm. This material, when analyzed, showed it to contain 27.1 per cent hydrolyzable chlorine, and had a density at 26° C. of 1.410. The theoretical value for hydrolyzable chlorine of dichlorophenylmethyldichlorosilane is 27.3 per cent.

Another run was conducted at 600° C. to give a somewhat lower yield of a product boiling between 156° and 166° C. at 33 mm. This fraction had a hydrolyzable chlorine value of 29.0 per cent, a density at 26° C. of 1.410, and was also believed to be dichlorophenylmethyldichlorosilane.

EXAMPLE 6

Approximately 1100 parts of a mixture of methyldichlorosilane and orthodichlorobenzene in a molar ratio of one mol of the former to 1.25 mols of the latter were passed through a hot iron tube at atmospheric pressure maintained at about 600° C. at the rate of about 500 parts per hour. Fractional distillation of the reaction product and analysis thereof showed that substantial amounts of chlorophenylhalogenosilanes had been obtained including chlorophenymethyldichlorosilane, chlorophenyltrichlorosilane, etc.

EXAMPLE 7

1,2,4-trichlorobenzene and trichlorosilane in the molar ratio of 1.25 mols of the former to 1 mol of the latter were passed at atmospheric pressure through a hot tube maintained at 500° C. Fractional distillation and analysis of the reaction product showed that substantial amounts of dichlorophenyltrichlorosilane had been formed. Thus, it was found that about 120 parts of the latter compound were obtained boiling between 165° and 175° C. at 29 mm. from about 700 parts of the mixture of reactants.

When the above conditions and proportions of reactants were repeated with the exception that the temperature of reaction was 600° C. and the rate of through-put was about 500 to 525 parts per hour, there was obtained about 225 parts of a fraction boiling between 150° and 170° C. at 29 mm. which analysis showed to be almost pure dichlorophenyltrichlorosilane.

The two fractions from the 500° C. and 600° C. runs were combined and redistilled to obtain essentially pure dichlorophenyltrichlorosilane boiling at 155° C. at 27 mm. and having a density at 26° C. of 1.537. Analysis of this compound showed it to have an average value of 37.6 per cent hydrolyzable chlorine which compared favorably with the theoretical value of 38.0 per cent.

EXAMPLE 8

Orthodichlorobenzene and trichlorosilane in the molar ratio of 1.25 mols of the former per mol of the latter were passed through an iron tube at atmospheric pressure at a temperature of about 500° C. In all, two runs were made on this mixture using a total of about 950 parts of feed, one run using a rate of about 525 parts of the mixture of reactants per hour and the other 500 parts of the mixture of the reactants per hour. In the first run, approximately 140 parts of a product boiling between 150° and 153° C. at 47 mm. were obtained. Analysis of this sample showed it to have a density at 26° C. of 1.443 and 42.0 per cent hydrolyzable chlorine. Distillation of the second run yielded about 115 parts of a fraction boiling between 132° and 140° C. at 30 mm. and having a density at 26° C. of 1.448 and 43.8 per cent hydrolyzable chlorine value. It appeared that good yields of chlorophenyltrichlorosilane were obtained as evidenced by the fact that the theoretical hydrolyzable chlorine value for this compound is 43.3 per cent.

EXAMPLE 9

In this experiment, a mixture of 230 parts methyldichlorosilane and 553 parts chlorobenzene was passed through a hot tube, without packing or catalysts, maintained at a temperature of 550° C. at atmospheric pressure. Fractional distillation and analysis of the reaction product indicated sizable proportions of methylphenyldichlorosilane were obtained in the reaction.

EXAMPLE 10

A mixture of ingredients comprising approximately in the molar ratio of 2 mols 2-chlorothiophene (thienyl chloride) and 1 mol trichlorosilane was passed through a hot iron tube at atmospheric pressure and maintained at a temperature of 525° C. Approximately one-third of the reaction product having a boiling point of 108° C. at 45 mm. was isolated by fractional distillation. This product on analysis was shown to have a value of 48.7 per cent hydrolyzable chlorine. The theoretical value for hydrolyzable chlorine for thienyl trichlorosilane

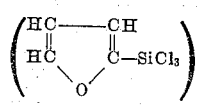

is 49.0 per cent, establishing that the bulk of the reaction product was, in fact, this compound. The density of the compound was found to be 1.427 at 26° C.

Hydrolysis of the thienyl trichlorosilane in a hydrolyzing medium comprising water and ethyl ether resulted in separation of an ether layer which when removed from the water layer and the ether removed by heating, left behind a resin which was hard, brittle and nearly water-white in color. The resin was obtained essentially in a quantitative yield. Heating of this resin showed that its heat stability compared favorably with the heat stability of resins made from phenyl trichlorosilane and that the sulfur in the thienyl nucleus was stable.

EXAMPLE 11

2 - chlorothiophene (thienyl chloride) and methyl dichlorosilane ($CH_3SiHCl_2$) in a molar ratio of 2:1 were passed through a hot iron tube maintained under the same conditions as in Example 10. Fractional distillation of the reaction product yielded a fraction approximately one-seventh the weight of the total reaction product boiling at 101° C. at 34 mm. which on analysis was shown to have a value of 35.3 per cent hydrolyzable chlorine. The theoretical value of thienyl methyl dichlorosilane

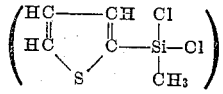

is 36.0 per cent hydrolyzable chlorine thus establishing the formation of the latter compound. The density of this composition at 28° C. was found to be 1.313.

In all the foregoing examples, in addition to the desired reaction product, there are also present varying amounts of unreacted halogenosilanes and aromatic halides, together with by-products of the reaction including silicon tetrachloride. The unreacted materials can be recycled or reused again in future reactions.

Although temperatures within the range from about 470° C. to 600° C. have been disclosed as having been used in the foregoing examples, it will be apparent that higher or lower temperatures may be employed without departing from the scope of the invention. The upper limit of the temperature range is generally determined by the stability of the reactants under the reaction conditions as well as the reaction product. Usually, this upper limit is one below which undesirable decomposition of either the reactants or the reaction product takes place.

In addition to the reactions described in the foregoing examples, it will be apparent that other combinations of reactants are included within the scope of our claimed invention. Thus, one may effect reaction between, for instance, dichlorosilane (SiH₂Cl₂) and chlorobenzene to produce such materials as, for example, phenyldichlorosilane (C₆H₅SiHCl₂) and diphenyldichlorosilane [(C₆H₅)₂SiCl₂]. Usually, in the practice of our invention, the reaction between the halogenosilane and the aromatic halide results in the formation of a molecule of hydrogen halide, the atoms of the hydrogen halide being derived from the hydrogen of the halogenosilane and the halogen of the aromatic halide.

We have also discovered that we are able to obtain improved yields of aromatic halogenosilanes by effecting the reaction between the aromatic halide and the halogenosilane containing at least one silicon-bonded hydrogen and at least one silicon-bonded halogen in the presence of metallic palladium. The palladium may be used in several ways. One method comprises depositing the palladium in the form of a dilute aqueous palladium nitrate solution on an inert inorganic packing as, for example, glass wool. The following example illustrates the advantages obtained using palladium as a catalyst for the reaction between chlorobenzene and SiHCl₃.

EXAMPLE 12

In the following runs, a mixture of chlorobenzene and SiHCl₃ in the molar ratio of two parts of the former per part of the latter, was passed at a temperature of about 525° C. through each of four steel tubes (about 54" long and 2½" diameter) for equal lengths of time using essentially the same amount of reactants and employing the same rate of passage of the mixture. In run No. 1 no packing and no catalyst were employed, the mixture of reactants being merely passed through at the stipulated temperature of 525° C. In run No. 2 the tube was packed with glass wool thoroughly saturated with a dilute aqueous palladium nitrate solution. The tube with its treated glass wool packing was heated at a temperature of about 500° to 600° C. for approximately eight hours to drive off the water and to decompose the palladium nitrate to metallic palladium (about 17 grams) which was homogeneously dispersed throughout the packing. The following table shows the results of the foregoing two runs:

Table No. II

| Run No. | Temperature °C. | Yield Per Cent C₆H₅SiCl₃ | Catalyst |
| --- | --- | --- | --- |
| 1 | 525 | 34.0 | None |
| 2 | 525 | 41.8 | Palladium |

From the foregoing it will be apparent that, using palladium as a catalyst, approximately 20 per cent greater yields of phenyltrichlorosilane can be realized in the reaction between chlorobenzene and SiHCl₃ than is possible when the palladium is omitted. The amount of palladium can be varied within wide limits as will be apparent to those skilled in the art.

The organohalogenosilanes obtained in accordance with our claimed process may be employed to render water-repellent surfaces originally water-non-repellent. In addition, they may be used as intermediates in the preparation of organopolysiloxane resins, oils, rubbers, etc.

What we claim as new and desire to secure by Letters Patent of the United States is:

1. The process which comprises passing under substantially anhydrous conditions and in the vapor phase a mixture of ingredients comprising (1) chlorobenzene and (2) methyldichlorosilane through a heated zone maintained at a temperature of around 450° to 575° C. and containing a catalyst comprising palladium, thereby to obtain methyl phenyldichlorosilane; and thereafter isolating the aforesaid methyl phenyldichlorosilane.

2. The process which comprises passing under substantially anhydrous conditions and in the vapor phase a mixture comprising (1) dichlorobenzene and (2) trichlorosilane through a heated zone maintained at a temperature of around 450° to 575° C. and containing a catalyst comprising palladium, thereby to obtain chlorophenyltrichlorosilane; and thereafter isolating the aforementioned chlorophenyltrichlorosilane.

3. The process which comprises passing under substantially anhydrous conditions and in the vapor phase a mixture comprising (1) an aromatic halide in which the only substituent on the aromatic nucleus is halogen which is attached directly to the said aromatic nucleus and (2) a halogenosilane corresponding to the general formula $SiH_mX_nR_{4-m-n}$, where $X$ is halogen, $R$ is a monovalent hydrocarbon radical, and $m$ and $n$ are each integers equal to from 1 to 3, inclusive, the total of $m$ and $n$ being equal to at most 4, the said passage of ingredients being conducted through a heated zone containing a catalyst comprising palladium and maintained at a temperature of around 450 to 575° C., thereby to obtain an aromatic halogenosilane containing the aromatic group attached to silicon by a carbon-silicon linkage and there being present in the aromatic nucleus one less halogen than was originally attached thereto, and thereafter isolating the aforesaid aromatic halogenosilane.

4. The process which comprises passing under substantially anhydrous conditions and in the vapor phase a mixture comprising (1) chlorobenzene and (2) trichlorosilane through a heated zone containing a catalyst comprising palladium and maintained at a temperature of around 450° to 575° C., thereby to obtain phenyltrichlorosilane; and thereafter isolating the aforesaid phenyltrichlorosilane.

DONALD MOHLER.
JESSE E. SELLERS.

REFERENCES CITED

The following references are of record in the file of this patent:

UNITED STATES PATENTS

| Number | Name | Date |
| --- | --- | --- |
| 2,379,821 | Miller | July 3, 1945 |
| 2,405,019 | Dalin | July 30, 1946 |
| 2,469,355 | De Pree | May 10, 1949 |
| 2,499,561 | Barry | Mar. 7, 1950 |
| 2,500,652 | Barry | Mar. 14, 1950 |
| 2,510,853 | Barry et al. | June 6, 1950 |
| 2,511,820 | Barry et al. | June 13, 1950 |

FOREIGN PATENTS

| Number | Country | Date |
| --- | --- | --- |
| 596,800 | Great Britain | Jan. 12, 1948 |